Inventors
BRUNO BRILL
KARLHEINZ ZÖLZER
BY Stephens, Huettig + O'Connell
ATTORNEYS

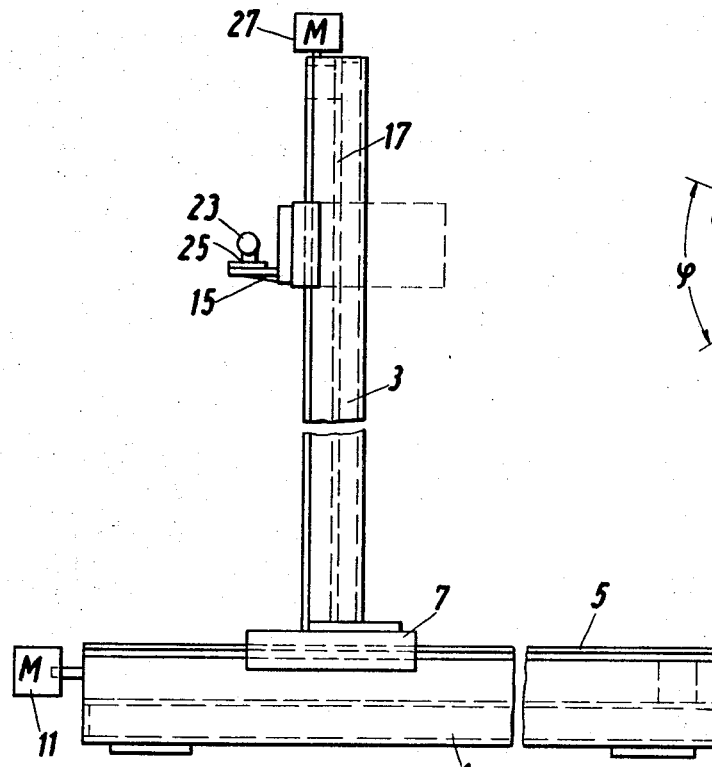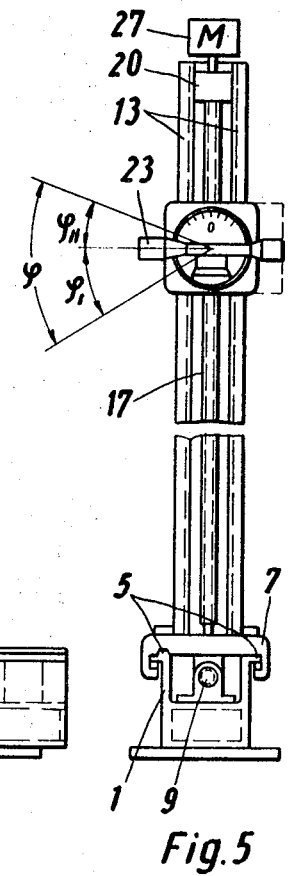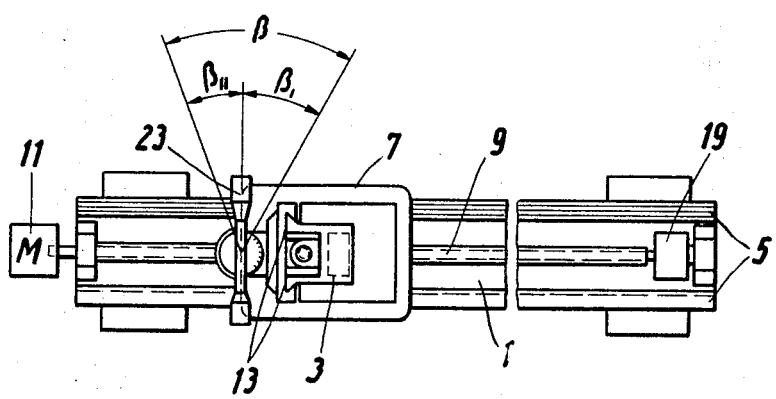

United States Patent Office 3,545,086
Patented Dec. 8, 1970

3,545,086
SURVEYING SPACE COORDINATES IN AN ENGINEERING MODEL
Bruno Brill, Muhlheim (Main), and Karlheinz Zölzer, Korbach, Germany, assignors to Metallgesellschaft Aktiengesellschaft, Frankfurt am Main, Germany
Continuation of application Ser. No. 685,703, Nov. 24, 1967. This application Oct. 16, 1969, Ser. No. 867,432
Claims priority, application Germany, Nov. 26, 1966, M 71,787
Int. Cl. G01c 1/00
U.S. Cl. 33—63
14 Claims

ABSTRACT OF THE DISCLOSURE

The space coordinates for an engineering model such as a pipework model are determined by sighting each point on the model through two telescopes slidably displaceable along two coordinates of a three dimensional coordinate system. The distances from the system's zero point are measured by counting the revolutions of the threaded shafts used to move the telescopes. The revolutions are converted to linear distances trigonometrically corrected if necessary, and are then automatically recorded.

---

This is a continuation of Ser. No. 685,703, filed Nov. 24, 1967 and now abandoned.

This invention relates to a method for dimensionally surveying objects, particularly for the purpose of their representation in the form of an engineering drawing, by measuring the coordinates in space of selected points on the surveyed object.

The method of this invention is primarily concerned with the representation of pipework in the form of engineering drawings by measuring the coordinates in space of a plurality of points on a model of said pipework.

When installations for the mineral oil or for the petrochemical or chemical industries are being planned, a considerable and possible even the major part of the preparatory work relates to the planning, design and calculation of pipework.

For many projects it is still the practice to prepare a large number of engineering drawings comprising front, top and side views which then serve as a basis for further planning work, such as elasticity calculations of the pipework, pipe bridges, steel structures, static calculations of foundations and buildings, or detail plans of apparatus and machines. Many designers and draftsmen cooperate in doing this work.

In a more up-to-date method of planning, a scale model of the pipework is first made up of wire and plastics, the model including the associated apparatus and the machinery. From this model, isometric drawings are then prepared which provide the basis for all further planning work.

However, both methods require the cooperative effort of a large experienced and skilled staff. The circumstance that the number of possible sources of error also increases in proportion to the number of members in such a team, has always been accepted as an unavoidable risk.

French patent specification No. 1,388,694 and British patent specification No. 1,016,038 describe a method and apparatus adapted to draw objects in isometric representation quite automatically. This method is described with reference to the layout of the pipe system in a chemical plant and consists in first drawing all the apparatus and machinery in their allocated places in a layout. Their pipe connections are calculated in three dimensional coordinates X, Y and Z and fed into a data processing plant. A large number of calculating programs are stored in the data processing plant which is instructed within prescribed limits to determine the paths of connecting pipework and to represent the same with the aid of a controlled drawing machine. For performing these computations, a large number of limiting conditions are fed into the data processing plant. These are first of all the coordinates of the spaces occupied by the apparatus and machines. Each pipeline drawn further increases the number of limiting conditions since the same space cannot be used twice. Other limiting conditions consist, for instance, in the requirement that the pipelines should be parallel and spaced as closely as possible.

The descriptions of this method do not disclose the magnitude of the programming facilities that are required and they are imbued with the idea that a computer can never err.

It is the object and intention of this method that the work of the draftsmen and designers should be transferred to the programming personnel. However, the question who checks the work done by the data processing plant is not discussed.

The present invention is based on the premises that the layout of the pipework should remain under the control of the designer particularly at the inception of the planning work and that the first steps should be performable by a team comprising the minimum number of persons in order to limit the number of possible sources of error which increases with the number of persons participating in the work.

Furthermore, it is envisaged that the basic data which naturally are measurements of length should be obtained in a form which permits the subsequent operations to be delegated to a data processing plant. Substantially these are the space coordinates of the points which determine the geometry of the model. As is conventional, the coordinate axes contained in a horizontal plane will be herein referred to as the $x$ and $z$ axes and the vertical axis as the $y$ axis.

The expression "subsequent operations" relates for instance to elasticity calculations with reference to given process conditions, such as pressure, temperature, aggregate state, the calculation of weights, the counting of component types and like parts and so forth, as well as the compilation of parts lists and the controlled drawing of the layout of the pipework.

According to this invention there is provided a method of surveying a model of pipework or of another engineering model, wherein the coordinates on a three-dimensional coordinate system of a plurality of points on the model are measured by taking a sighting on each of the points in space which together define the geometry of the model through two telescopes which are provided with cross hairs and each adapted by lead screws to be slidably displaced parallel to two axes of the three-dimensional coordinate system, and wherein the distance of slidable displacement of each of said telescopes from the origin of the coordinate system is measured by multiplying the revolutions of the lead screws by their linear pitch.

The distances as measured by revolution counters associated with the lead screws are the coordinates in space of the sighted point.

For example, it is the practice in the layout of refineries to place the individual sections of the pipework horizontal or vertical and parallel to one another, and it is therefore advisable to ensure that the optical axes of the two telescopes are horizontal so as to be able directly to measure the true coordinates of the sighted points.

When the model of a pipework system is measured, lengths of pipe which are parallel in a common plane will therefore differ only with respect to one of their coordinates.

When the optical axes of the two telescopes are positioned in a plane containing a plurality of such parallel pipes, then the pipe which is closest to and extends transversely across the line-of-sight of one of the telescopes will interpose itself in the line-of-sight from the telescope to the other pipes in this plane. It will therefore be impossible to measure the position of flanges, fittings and the like associated with these other pipes.

For the purpose of taking sights on points which cannot be seen through the telescope when the latter is horizontal, the telescopes are provided with the usual equipment for inclining their optical axes and for taking angle readings in the vertical and in the horizontal. Whereas in a geodetic instrument the line-of-sight can be set to any angle, it is sufficient if the telescopes used for the purposes of the present method are inclinable at three readily reproducible fixed angular positions, such as 15°, 30° and 45°.

The coordinate readings obtained when the telescope is set to one of these angles will be hereinafter referred to as relative coordinates which must be converted to the true coordinates by computation.

These computations involve a number of simple trigonometric calculations for the two measurements, as will be hereinafter briefly explained.

The means by which the objects of the invention are obtained are described more fully with reference to the accompanying diagrammatic drawings in which:

FIG. 4 is a front elevational view of one of the measuring units;

FIG. 5 is a side elevational view of the unit shown in FIG. 4;

FIG. 6 is a plan view of the measuring unit shown in FIGS. 4 and 5; and

Figure 1:
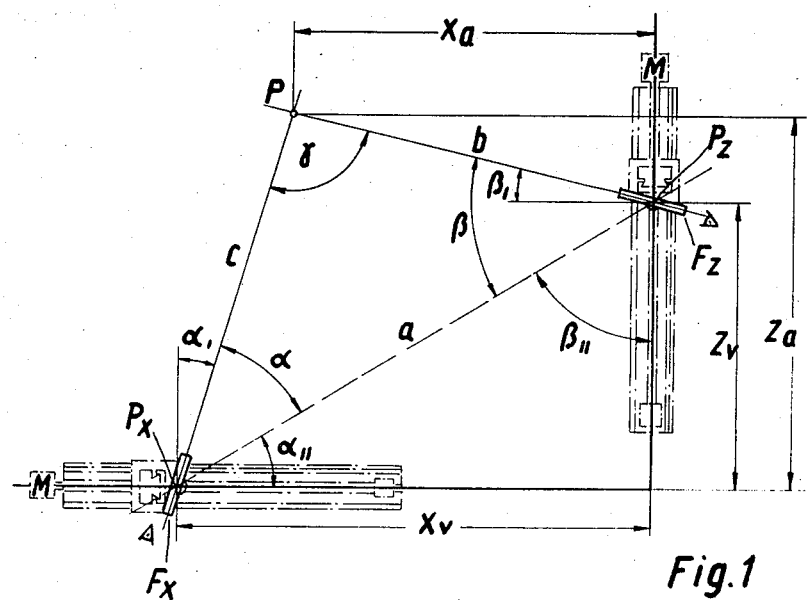
FIG. 1 is a schematic plan view of the measuring apparatus for determining the space coordinates for the point P.

As shown in FIG. 1, the true coordinates of the point P related to the coordinate axes $x$ and $z$ are $x_a$ and $z_a$. However, for reasons which are not specially indicated in the schematic sketch, it is assumed that point P cannot be sighted through the two telescopes $Fx$ and $Fz$ when these are located in the correct coordinate positions. The telescopes are therefore shifted from positions in which their lines of sight are normal to the axes $x$ and $z$ into positions in which a sighting is possible when their optical axes are inclined in relation to the normal at predetermined angles $\alpha'$ and $\beta'$ respectively.

The values $x_v$ and $z_v$, as well as the angles $\alpha'$ and $\beta'$ can be ascertained directly from the measuring apparatus. The measured lengths of the sides $a$, $b$ and $c$, as well as the angles $\alpha$, $\beta$, $\gamma$ and $\alpha''$, $\beta''$ are the functions of the well known values $x_v$, $z_v$ and $\alpha'$, $\beta'$.

The true coordinates $x_a$ and $z_a$, which are required, are in turn the function of the intermediate values $c$, $b$ and the angles $\alpha'$ and $\beta'$ which can be read off immediately.

The points P, $P_x$ and $P_z$ form a triangle with the sides $a$, $b$ and $c$ and the angles $\alpha$, $\beta$ and $\gamma$.

There are thus the following relations:

$$a = \sqrt{x_v^2 + z_v^2}$$

$$\sin \alpha'' = \frac{z_v}{a}$$

$$\sin \beta'' = \frac{x_v}{a} \text{ or } \beta'' = 180° - (90° + \alpha'')$$

The angles are related by the equations $$\alpha = 90° - (\alpha' + \alpha'')$$
$$\beta = 90° + \beta' - \beta''$$
$$\gamma = 180° - (\alpha + \beta)$$

Hence there follows:

$$b = \frac{a \cdot \sin \alpha}{\sin \gamma}; \quad c = \frac{a \cdot \sin \beta}{\sin \gamma}$$

And for the true coordinates:

$$x_a = b \cdot \cos \beta'$$
$$z_a = c \cdot \cos \alpha'$$

Figure 2:
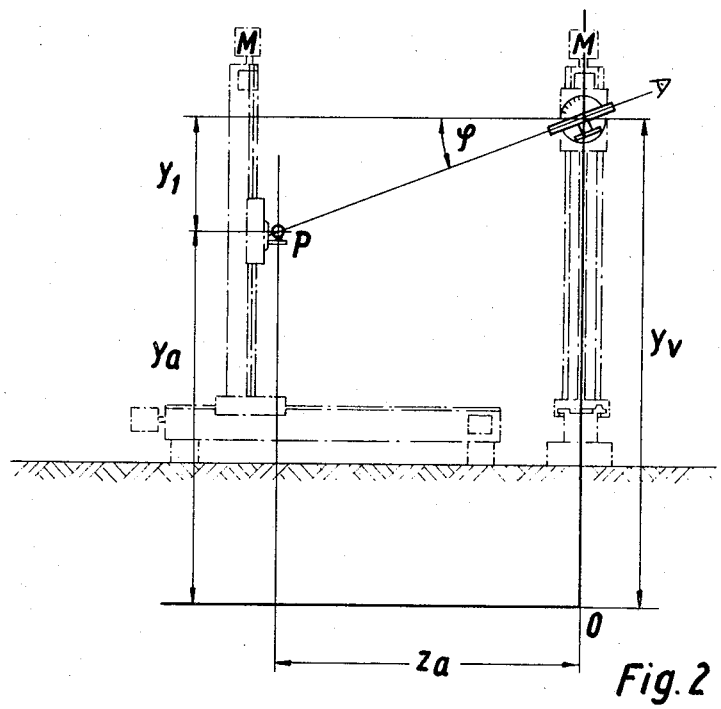
FIG. 2 is a front view of FIG. 1.

FIG. 2 illustrates a situation in which point P cannot be directly sighted through a telescope. The telescope F is therefore inclined to the horizontal at an angle $\varphi$.

In FIG. 2, the true coordinate on the $z$ axis is $z_a$ whereas the relative coordinate on the $y$ axis is $y_v$.

The lengths $y_v$, $z_a$ and angle $\varphi$ are therefore known, $y_a$ being required.

The following relationships hold:

$$y_a = y_v - y_1$$
$$y_1 = z_a \cdot \tan \varphi$$
$$y_a = y_v - z_a \cdot \tan \varphi$$

Since the angles of inclination of the telescopes are selectably fixed, the trigonometric functions in these calculations are constants and the measured relative coordinates can be readily reduced to the true coordinates by a suitably programmed calculation in the data processing unit. Measurements of points obtained by sighting at an angle other than the horizontal are provided with a number representing the address of the appropriate correcting operation for the selected angle in the data processing unit. The measured coordinates and their correcting numbers, if any, are further associated for recording or storage with an equipment code number which indicates the presence of a flanged joint, a branch, a valve, a measuring unit or the like at the sighted point.

Another reference that is provided is an ordinal number for identifying each individual pipeline and all the flanged joints, valves, measuring units and so forth which it contains. All the pipelines are consecutively identified by ordinal numbers. Conveniently all the measured points in a pipeline are likewise consecutively numbered.

The apparatus for performing the present method comprises two horizontal slide rails and two vertical columns, each being slidably movable on one of the rails. Each of these columns vertically slidably carries a telescope on a bracket. Each telescope is mounted on its bracket by hinges which permit the telescope to be set at one or more selectable fixed angles in the horizontal and in the vertical.

The sliding displacement of the columns on the rails and of the brackets on the columns is effected by lead screws, driven by electric motors and associated with revolution counters.

After multiplication of the counter revolutions with the pitch of the lead screws the counters directly indicate the distances of the telescope axes from the foot of the columns and that of the columns from the origin of the coordinate system located at the vertex of the right angle defined by the two slide rails.

The lead screws in the vertical columns may be synchronously driven by an electric motor at the top of each column, so that both telescopes are raised jointly to the same level.

The apparatus shown in FIGS. 3 to 7 comprises two horizontal slide rails 1 and 2 and two vertical slide rails 3 and 4.

The horizontal slide rails are the $x$ and $z$ axes of the coordinate system. They include a right angle and may be mounted on a baseplate which also forms the base of the model that is to be surveyed.

Ways 5 and 6 are machined into the upper surfaces of the horizontal rails. In conventional manner slides 7 and 8 are adapted to be traversed along the length of the rail axes by lead screws 9 and 10, respectively.

The lead screws are drivable by continuously variable speed D.C. motors 11 and 12, respectively.

The vertical columns 3 and 4 are mounted on the slides 7 and 8. They represent the y axis associated with the x and z axes of the coordinate reference system and are therefore normal thereto.

Slideways 13 and 14 are also machined into these vertical columns for the reception of brackets 15 and 16 which are slidably movable therein by lead screws 17 and 18, respectively. These lead screws are likewise drivable by variable speed D.C. motors 27 and 28.

The lead screws in the several slide rails are provided with revolution counters 19, 20, 21 and 22 which measure the full revolutions and fractions thereof and which are arranged to deliver current pulses to pulse counters.

Telescopes 23 and 24 are mounted on intermediate members 25 and 26 affixed to the brackets 15 and 16. These intermediate members 25 and 26 which in construction resemble the mountings of a theodolite permit the telescopes to be tilted in horizontal and vertical planes into any angular position. However, in the present arrangement, these mountings are modified to permit the telescopes to be arrested at fixed angles of 15°, 30° and 45°.

The telescopes 23 and 24 themselves may be monocular or binocular instruments and they are provided in conventional manner with cross hairs and reticles.

Figure 7:
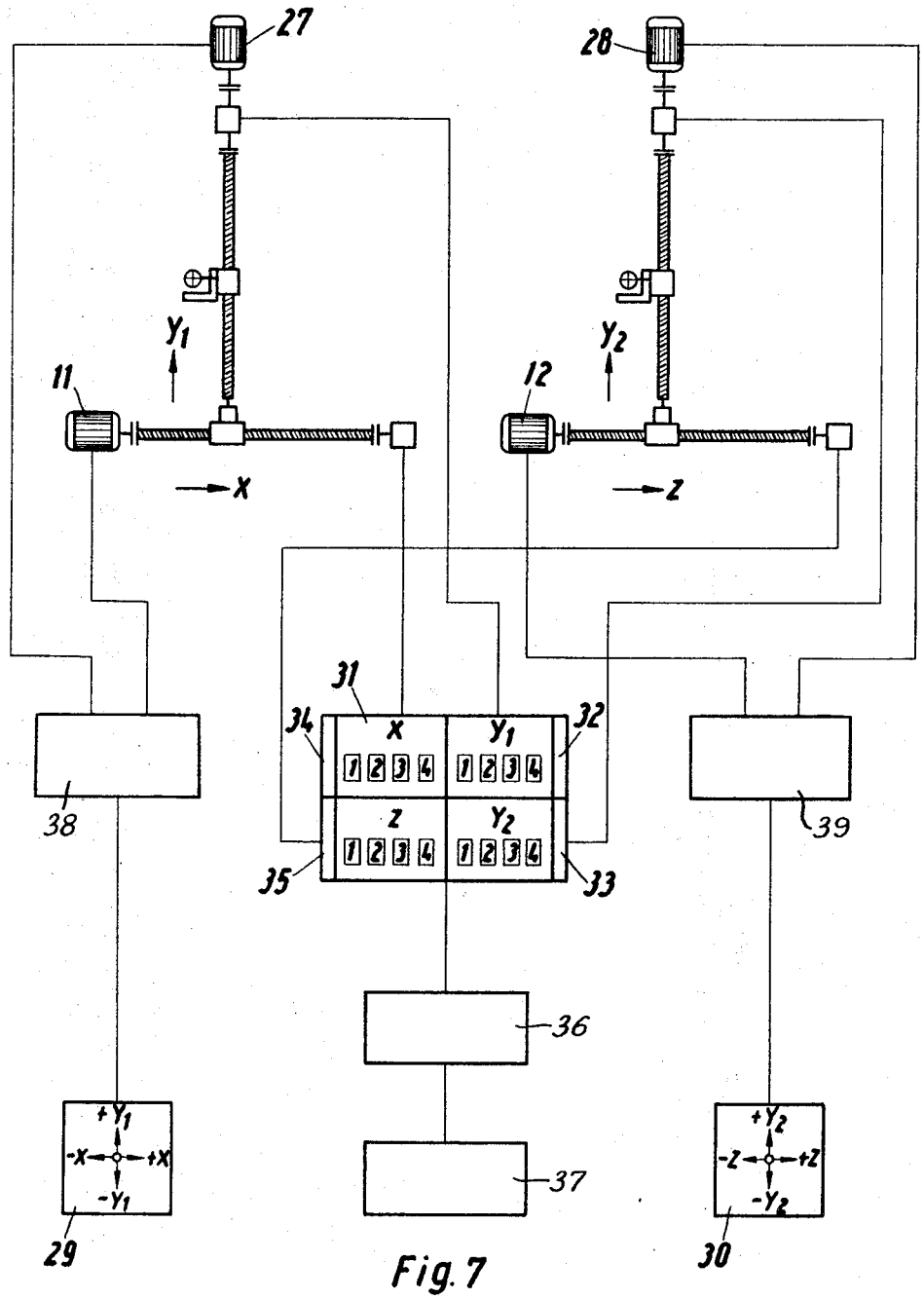
FIG. 7 is a circuit layout view of the drive means for the apparatus.

As will be understood from FIG. 7, each telescope 23 and 24 is associated with a pilot switch 29 and 30 which permits by means of thyristor systems 38 and 39 the driving motors 11, 12, 27 and 28 of the lead screws to be switched to forward and reverse operation.

The revolution counters, for instance, in the form of rotating perforated discs interposed between photocells and light sources transmit pulses to the pulse counter 31 according to the number of revolutions of the screw, the counter 31 converting the pulse numbers into lengths representing coordinate values which are fed to the data processing unit. The pulse counter has indicating windows 32, 33, 34 and 35 which indicate the trigonometric corrections which are transmitted to the computer 36 as computing instructions. The necessary trigonometric corrections are then made by the computer. The result is printed by a typewriter or printer 37.

The apparatus is so contrived with reference to the model that is to be surveyed that the two horizontal slide rails which represent the horizontal axes of the coordinate system are parallel to the assembly of pipes in the pipework.

It would in principle be possible to deviate from this condition of parallelism. However, this would mean that nearly all the measured coordinates would call for a trigonometric correction, thereby greatly increasing the number of data and the required storage capacity.

As such the model of say pipework could be readily surveyed by the present method by one operator using the present apparatus.

The operator must first identify the point he desires to measure and then adjust the two telescopes until the point is in the line-of-sight of both instruments. The true or relative coordinates can then be directly read. Preferably they are automatically provided by the revolution counters associated with the lead screws. The operator performing the measurement need then merely add the ordinal number identifying the pipeline in question, the equipment code and any trigonometric correction that may be applicable, as well as possibly the consecutive number of the measured point in question.

Figure 3:
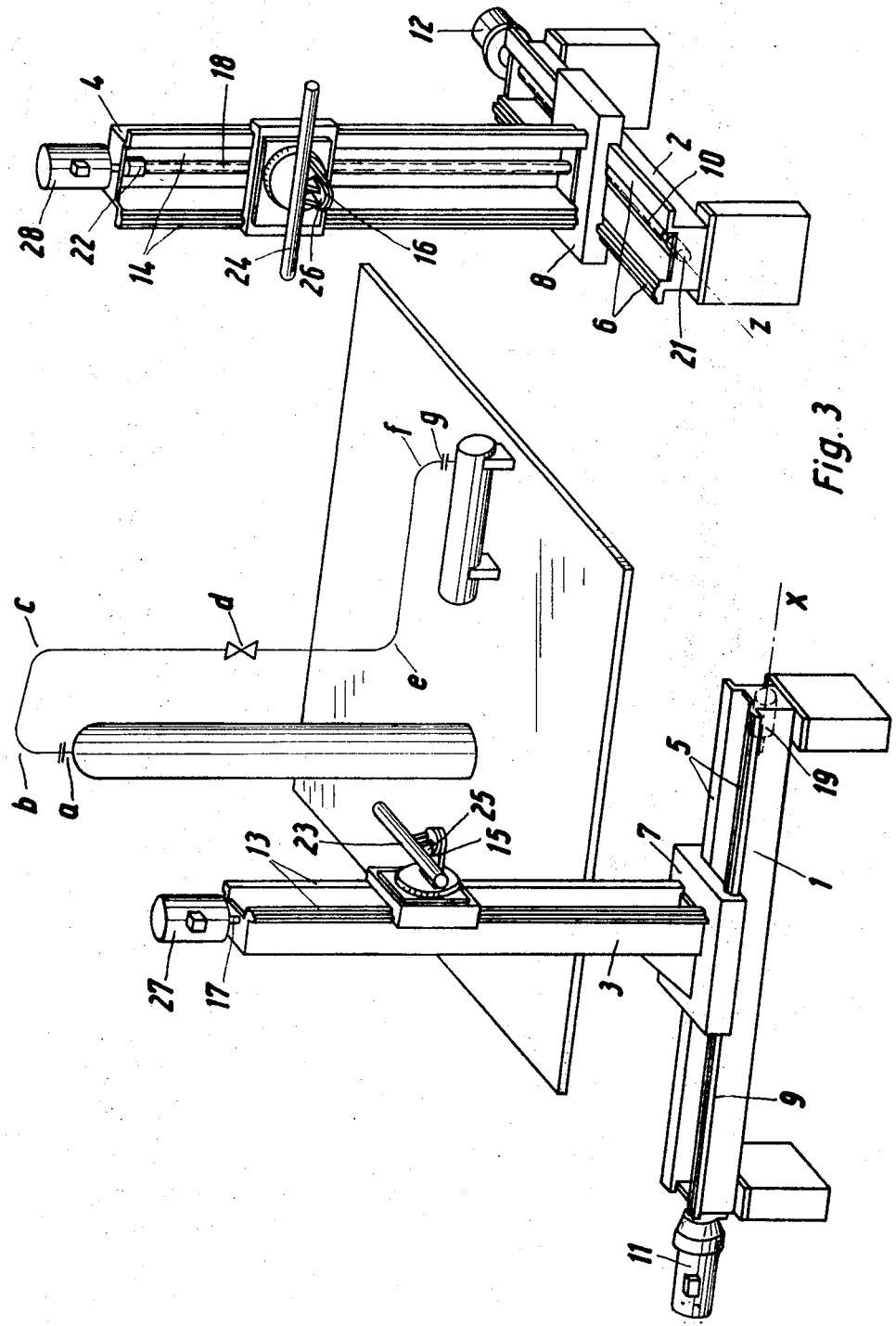
FIG. 3 is an isometric view of the apparatus in which the contours of a model that is to be surveyed are indicated by thin lines.

The first point thus measured is conveniently at one end point of a pipeline, such as the connecting flange at a tank, reactor or the like, for example the point marked a in FIG. 3. The equipment code and the ordinal number of this point are references for all further points measured in this pipeline. All the following measured points of the same ordinal number are automatically numbered consecutively from the first point. The next point will preferably be a point on the pipe itself close to the flange, for instance the point b in FIG. 3.

All the following points of the pipeline which differ only in one coordinate can be omitted provided their equipment codes and ordinal number are the same. However, if desired, a few intermediate points of this kind in a pipeline may nevertheless be located for the purpose of checking the invariance of data that ought not to change and of ensuring that unavoidable imprecision of the model is compensated.

The next point which must necessarily be located is one where both coordinates or one coordinate and an equipment code change.

The former applies where the pipe line has a bend (points b, c in FIG. 3). The latter applies where the pipeline contains a piece of equipment, such as a fitting, a flange, a branch or the like (point d in FIG. 3). Located points are marked, for instance, by means of a colored dot.

Pipelines which have ben completely surveyed are identified for instance by painting them in a distinctive color throughout their length. When a fresh pipeline is surveyed, the ordinal number is changed.

However, it is preferred that the work of surveying a model be performed by three persons of whom one indicates the point that is to be measured and ascertains the ordinal number and the equipment code whereas the two others operate the telescopes. All three together may then make a final check of the model.

For performing this work it is advantageous that the model should be fairly transparent. Components of the plant, such as reactors, towers, tanks, buildings and the like are represented in the same way as the pipelines by wires indicating the respective center lines. The connections on these components to which the pipelines are joined are represented by metal pins attached to the center wires at appropriate points.

The final result of such a survey of a model is a multitude of data each in the form of a group of numbers. The individual datum comprising the coordinates $x$, $y$ and $z$, the trigonometric corrections required by the positions of the telescopes, the ordinal number, the equipment code and the consecutive number of the measured point in a pipeline may be a group of nine digits. The number of digits may naturally be extended or reduced according to requirements.

Each of these data can be stored in a data processing unit in conventional manner. The following explanation is based on the assumption that the storage facility is in the form of punched cards. Each punched card will then bear the data relating to one measured point.

The data processing unit may then sort the cards. By sorting them according to their ordinal numbers, the data relating to each pipeline will be collated. From all the cards of the same ordinal number, the data processing unit can then compute the total length of the pipeline and of its individual sections between fittings and so forth, determine the number of fittings, etc. Ordinal numbers of pipelines of like diameter and wall thickness requiring fittings of like dimensions can also be collated in groups.

By performing such simple sorting operations and computational programmes a data processing unit can quickly provide a complete list of parts and record them in the output.

The collected data can also be prepared by suitably programmed operations for controlling a drawing machine, known as a "plotter," which is capable on the basis of the information received of providing isometric drawings as well as sectional drawings in planes parallel to each coordinate plane.

The advantage afforded by the present method is that all planning work can be handled by a small team of persons, the principal point being the consequent reduction in the number of sources of error and the possible concentration of controls rather than the saving in the cost of labor.

Another important aspect of the invention is that a final check can be performed during the survey which does not call for special skills but merely a little practice, such a check being carried out by experts in the field of installational construction work who have a clear grasp of the overall project.

Having now described the means by which the objects of the invention are obtained, we claim:

1. A method of defining an engineering model such as a pipework model by determining the space coordinates of a large number of points on said model comprising employing two telescopes each having cross hairs and each being mounted on lead screws for being slidably displaced parallel to two axes of a three dimensional coordinate system having a common zero point, moving the telescopes into position for sighting on one selected point on said model, measuring the distance the telescopes are moved from said zero point of said three dimensional coordinate system by multiplying the lead screw revolutions by their linear pitch for determining the space coordinates of said point on the model, and moving the telescopes for sighting other selected points on the model to define the geometry of the model.

2. A method as in claim 1, said telescopes being aligned parallel to the horizontal axes of said three dimensional coordinate system.

3. A method as in claim 1, at least one of said telescopes being inclined at an angle to the horizontal or to the vertical for sighting the relative coordinates of the point on the model, and then reducing the relative coordinates to the true coordinates by a programmed trigonometric correction.

4. A method as in claim 2, further comprising synchronously displacing both telescopes in the vertical direction of the three dimensional coordinate system.

5. A method as in claim 4, further comprising giving the same ordinal number to all points measured in the same pipeline.

6. A method as in claim 5, further comprising giving an equipment code number to each part of a pipeline such as a pipe length, a flange, a fitting, or a measuring point.

7. A method as in claim 6, further comprising consecutively numbering all the measured points in the same pipeline.

8. A method as in claim 7, further comprising allocating each measured point to a storage facility such as a punched card or magnetic memory device and which contains the measured relative or true space coordinates, the address of the relevant trigonometric correction, the equipment code number, the ordinal number, and the consecutive number in the series of points having the same ordinal number.

9. An apparatus for surveying a pipework model formed of pipelines comprising two slide rails mounted in the plane upon which the model rests and aligned parallel to the principal orientation directions of the pipelines, a lead screw and a slide mounted on each slide rail for displacement by said lead screw, screw rotating motor means, a column mounted on each slide, a bracket displaceable in a slideway by a column lead screw on each column, a telescope supported on each bracket, said telescope being hinged to its bracket for being inclined to a predetermined angle with respect to the horizontal or to the vertical, and a revolution counter joined to each lead screw, respectively.

10. An apparatus as in claim 9, said motor means comprising a D.C. servo motor joined to each lead screw.

11. An apparatus as in claim 10, each revolution counter including pulse generator associated with multiplier means for delivering the counted revolutions as lengths of distances from a starting point.

12. A method for obtaining isometric drawings and a list of parts of a chemical plant or the like comprising building a true and suitably transparent small scale model of the plant including the piping, measuring and coordinates of all points of interest by means of an optical device, transmitting the coordinates of each of said points of interest to a data processing unit, storing the results measured by said optical device, as well as additional data on the piping as fed into said data processing unit, plotting the isometric drawings and printing the list of parts by way of data processing using said coordinates determined and said data stored.

13. A method as in claim 12 further comprising measuring the beginning and the end coordinates of each part of each pipe and the like with respect to its related reactor or container or the like by means of an optical device using two telescopes and transmitting the data measured to a data processing unit, feeding the specification of each part into said data processing unit, determining length and direction of each part of each pipe and the like by means of said data processing unit, feeding said data concerning length direction and specification of each part of each pipe or the like to a second data processing unit and said second data processing unit plotting the isometric drawings and printing the list of parts.

14. A method as in claim 13, further comprising transmitting the informations of said first data processing unit on punched cards or the like and using said punched cards to transfer the information to said second data processing unit.

References Cited

UNITED STATES PATENTS

| | | | |
|---|---|---|---|
| 310,253 | 1/1885 | Cerebotani. | |
| 441,975 | 12/1890 | Rapieff. | |
| 2,849,911 | 9/1958 | Brunson. | |
| 3,295,210 | 1/1967 | Kelsey | 33—18C |

FOREIGN PATENTS

| | | | |
|---|---|---|---|
| 1,016,038 | 1/1966 | Great Britain | 33—18A |

HARRY N. HAROIAN, Primary Examiner

U.S. Cl. X.R.

33—1, 46